United States Patent Office 3,652,613
Patented Mar. 28, 1972

3,652,613
PROCESS FOR THE PRODUCTION OF
PLATINUM COMPOUNDS
Donald Wright, Stockton-on-Tees, England, assignor to
Imperial Chemical Industries Limited, London, England
No Drawing. Filed Sept. 23, 1969, Ser. No. 860,408
Claims priority, application Great Britain, Oct. 4, 1968,
47,229/68
Int. Cl. C07f 15/00
U.S. Cl. 260—429 R                10 Claims

ABSTRACT OF THE DISCLOSURE

Platinous carboxylates, particularly platinous alkanoates such as platinous acetate, are obtained by reacting a platinic halide with a metal carboxylate, particularly a silver carboxylate, which forms a halide insoluble in the reaction medium.

---

The present invention relates to the production of platinum compounds particularly to the production of platinous carboxylates.

According to the invention a process for the production of a platinous carboxylate containing 2 or more carbon atoms comprises reacting at an elevated temperature a platinic halide with the carboxylate containing 2 or more carbon atoms of a metal which forms a halide insoluble in the reaction medium.

The insoluble metal halide is separated and the platinous carboxylate recovered from the reaction medium.

The process of the present invention can suitably be used to prepare platinous salts of monocarboxylic acids with the exception of formic acid e.g. alkanoic acids, particularly akanoic acids containing 2 to 22 carbon atoms such as acetic, butyric, trimethyl acetic, caproic, pelargonic, lauric, stearic and behenic acids, the acids of lower carbon number e.g. up to $C_6$ being preferred. Alkenoic acid salts may also be prepared, e.g. salts of acrylic, crotonic, undecylenic and oleic acids and also salts of cycloalkanoic and cycloalkenoic acids such as cyclohexane and cyclohexene carboxylic acids respectively. The process may also be used to prepare platinous salts of aromatic mono carboxylic acids, e.g. phenyl carboxylic acids such as benzoic and toluic acids, naphthalene and anthracene, carboxylic acids, and substituted aromatic acids e.g. aminobenzoic, hydroxybenzoic and anisic acids. Platinous salts of dicarboxylic acids are also amenable to production by the process of the present invention e.g. alkane dicarboxylic acids such as oxalic, malonic, succinic, glutaric, adipic, pimelic, suberic, azelaic and sebacic acids; alkene dicarboxylic acids such as maleic, fumaric, citraconic, mesaconic and itaconic acids and aromatic dicarboxylic acids such as the phthalic acids. The carboxylate for use in the process may also contain substituents which may be hydrocarbon or non-hydrocarbon in nature e.g. chloracetic, glycolic, glyoxylic, vinyl acetic, phenyl acetic, pyruvic and cinnamic carboxylates may all be reactants in the process.

The preferred platinic halide for use in the process is platinum tetrachloride. The reaction is carried out in an inert liquid medium in which both reactants are preferably soluble but in which the coproduced metal chloride is insoluble. A suitable medium is a saturated ether e.g. an alkyl ether such as di-n-propyl ether or di-isopropyl ether or a cyclic ether such as tetrahydrofuran. Other suitable reaction media include carboxylic acids particularly those equivalent to the metal carboxylate which are liquid under the reaction conditions, esters e.g. dinonylphthalate, and ethyl acetate and ketones, e.g. acetone and methyl ethyl ketone. The metal carboxylate which is used in the process is derived from a metal which gives rise to a halide insoluble in the reaction medium, silver carboxylates being preferred.

The process of the invention is carried out at an elevated temperature e.g. a temperature up to 200° C., preferably in the range 50° to 150° C. The platinic halide and metal carboxylate may be used in stoichiometric amounts but generally it is preferred to have the metal carboxylate in slight excess of the stoichiometric amount e.g. 5 moles univalent metal carboxylate per mole platinic halide (4 moles being the stoichiometric amount).

The process may be improved by incorporating a small quantity of formic acid in the reaction medium suitably the molar equivalent of the platinic halide used. This has the effect of increasing the rate at which the platinous carboxylate is formed. Excess formic acid should be avoided however as it tends to reduce the platinum compounds to platinum metal.

If desired the reaction may be carried out in two stages. In the first stage the platinic halide is reacted with the metal carboxylate at ambient temperatures and the intermediate so formed decomposed at an elevated temperature to yield the platinous carboxylate.

EXAMPLE 1

Platinum tetrachloride hydrate (5 grams, 12.5 millimoles) and silver acetate (11 grams, 66 millimoles) were shaken together in 300 mls. acetic acid. The mixture was then refluxed for 90 minutes during which time a colour change occurred from yellow brown to violet. The mixture was cooled and filtered and the filtrate evaporated. The residue from the evaporation was purified by extraction with dichloromethane to yield a purple solid which on treatment with triphenylphosphine yielded the known product bis(triphenylphosphine) platinous acetate. The yield of platinous acetate was 3 grams i.e. 75%.

EXAMPLE 2

Platinum tetrachloride hydrate (2 grms) in 20 mls. diethyl ether was shaken with silver acetate (4.4 grams) and the resulting yellow powder filtered and dried. This powder was then heated at reflux in acetic acid (100 mls.) containing 0.23 gram of formic acid. The solution turned deep blue and after 15 minutes it was filtered and the filtrate evaporated. After extraction with dichloromethane 1.15 grams of platinous acetate was obtained (73% yield).

EXAMPLE 3

Platinum tetrachloride hydrate (1.0 gram) in 20 mls. acetone was shaken with silver benzoate (2.7 grams) and the resulting yellow powder filtered and dried. This powder was then heated in a mixture of 100/120 petroleum ether (5 mls.), benzoic acid (5 grams) and formic acid (0.095 ml.). The solution turned blue and was cooled and extracted, firstly with hot petroleum ether to remove the benzoic acid and finally with methylene chloride followed by acetone to extract the platinous benzoate.

What is claimed is:

1. A process for the production of a platinous carboxylate containing 2 to 22 carbon atoms which comprises reacting at an elevated temperature in an inert liquid medium a platinic halide with a silver carboxylate containing 2 to 22 carbon atoms which forms a halide insoluble in the reaction medium, said carboxylate being derived from a carboxylic acid selected from the group of alkanoic acids, cycloalkanoic acids, alkenoic acids, cycloalkenoic acids, aromatic monocarboxylic acids, substituted aromatic monocarboxylic acids, alkane dicarboxylic acids, alkene dicarboxylic acids, aromatic dicarboxylic acids, chloroacetic acid, glycolic acid, glyoxylic acid, vinyl acetic acid, phenyl acetec acid, pyruvic acid and cinnamic acid, separating said silver halide from said medium and recovering the platinous carboxylate from the medium.

2. The process of claim 1 in which the platinic halide is platinum tetrachloride.

3. The process of claim 1 in which 5 moles of silver carboxylate are present per mole of platinic halide.

4. The process of claim 1 in which the elevated temperature is in the range 50° to 150° C.

5. The process of claim 1 in which the carboxylic acid is an alkanoic acid containing 2 to 6 carbon atoms.

6. The process of claim 1 in which the inert liquid medium is selected from the group consisting of carboxylic acids equivalent to the silver carboxylate, saturated ethers, esters, or ketones.

7. The process of claim 1 in which a small quantity of formic acid is present.

8. The process of claim 1 in which the platinic halide is reacted with the silver carboxylate at ambient temperature and an intermediate so formed is subsequently decomposed at an elevated temperature to yield the platinous carboxylate.

9. The process of claim 1 in which platinous acetate is prepared by reacting silver acetate with platinum tetrachloride at an elevated temperature up to 200° C. in an inert liquid medium, separating precipitated silver chloride and recovering platinous acetate from the medium.

10. The process of claim 9 in which formic acid is present in molar equivalence to the platinic chloride used.

References Cited
UNITED STATES PATENTS 2,890,232   6/1959   Rogers et al. _____ 260—414

OTHER REFERENCES

Stephenson et al., J. Chem. Soc., 1965, pp. 3632–3640.

TOBIAS E. LEVOW, Primary Examiner

A. P. DEMERS, Assistant Examiner